United States Patent
Hanaoka et al.

(10) Patent No.: US 8,074,344 B2
(45) Date of Patent: Dec. 13, 2011

(54) METHOD OF MANUFACTURING ROTOR HOLDER

(75) Inventors: Satoru Hanaoka, Kyoto (JP); Tomotsugu Sugiyama, Kyoto (JP); Shinya Tabata, Kyoto (JP); Takashi Tsukada, Kyoto (JP)

(73) Assignee: Nidec Corporation, Kyoto (JP)

( * ) Notice: Subject to any disclaimer, the term of this patent is extended or adjusted under 35 U.S.C. 154(b) by 529 days.

(21) Appl. No.: 12/145,528

(22) Filed: Jun. 25, 2008

(65) Prior Publication Data
US 2009/0001825 A1  Jan. 1, 2009

(30) Foreign Application Priority Data
Jun. 27, 2007 (JP) .................................. 2007-168658

(51) Int. Cl.
*H02K 15/03* (2006.01)
*H02K 15/16* (2006.01)

(52) U.S. Cl. ...................... 29/598; 310/156.12; 310/265

(58) Field of Classification Search ............... 29/596, 29/598; 310/265, 156.12–156.15; 73/66
See application file for complete search history.

(56) References Cited

U.S. PATENT DOCUMENTS

| 3,844,031 A | * | 10/1974 | Stone et al. ................... 29/596 |
| 2002/0047384 A1 | | 4/2002 | Matsumoto |
| 2003/0184168 A1 | | 10/2003 | Matsumoto |
| 2004/0191088 A1 | | 9/2004 | Matsumoto |

FOREIGN PATENT DOCUMENTS

| JP | 64-74049 | | 3/1989 |
| JP | 1-152136 | | 10/1989 |
| JP | 1-154350 | | 10/1989 |
| JP | 05-252704 | | 9/1993 |
| JP | 07-013095 | | 1/1995 |
| JP | 07-075301 | | 3/1995 |
| JP | 09308153 A | * | 11/1997 |
| JP | 3126341 | | 11/2000 |
| JP | 2002-039096 | | 2/2002 |
| JP | 2002142392 | | 5/2002 |
| JP | 2004-159421 | | 6/2004 |

OTHER PUBLICATIONS

Machine Translation of JP09308153, obtained Feb. 13, 2011.*
Tabata et al.; "Rotor Yoke and Balance Adjusting Method Thereof"; U.S. Appl. No. 12/468,123, filed May 19, 2009.

* cited by examiner

*Primary Examiner* — Livius R Cazan
(74) *Attorney, Agent, or Firm* — Keating & Bennett, LLP

(57) ABSTRACT

The manufacturing method of a rotor holder according to the present invention includes a step in which a top plate portion having a substantially discoid shape substantially centered about a central axis, and a side wall portion extending from an outer circumferential edge of the top plate portion are formed simultaneously by feeding a metal plate in a predetermined direction and pressing the metal plate by a die. Also, the present manufacturing method includes a step in which a punched portion is formed at the side wall portion.

8 Claims, 18 Drawing Sheets

US 8,074,344 B2

METHOD OF MANUFACTURING ROTOR HOLDER

FIELD OF THE INVENTION

The present invention relates to a motor, a rotor holder and its manufacturing method. Also, the present invention relates to a fan having the motor including the rotor holder.

BACKGROUND OF THE INVENTION

Conventionally, a fan which includes an impeller having a plurality of blades powered by a motor is arranged inside an electronic device so as to cool heated components therein and to let out the heated air of the electronic device. In recent years, due to an increase in the amount of heat generated by the electronic device, the rotation speed of the impeller is increased.

When the rotation of the impeller is increased, a significant amount noise may be generated if a weight balance of a rotor assembly including a rotor portion (including the impeller) of the motor with respect to a rotational axis thereof is compromised. Also, when the rotation of the impeller is increased, the motor may be vibrated generating noise. In particular, the rotor holder of the rotor portion retaining thereat a field magnet is often made of a metal material, which is usually heavier than the material used to manufacture other elements of the motor, and therefore, the rotational balance of the rotor holder is a critical element of the operation of the motor.

SUMMARY OF THE INVENTION

The present invention provides a manufacturing method of a rotor holder in a motor, the method comprising the steps of a) forming a top plate portion having a substantially discoid shape substantially centered about a central axis, and a side wall portion extending in a direction substantially parallel to the central axis from an outer circumferential edge of the top plate portion by simultaneously feeding a metal plate in a predetermined direction and pressing the metal plate by a die, and b) forming a punched portion at the side wall portion by the die before step a) is completed.

By such manufacturing method, it becomes possible to manufacture the rotor holder in an efficient and speedily manner.

Other features, elements, steps, characteristics and advantages of the present invention will become more apparent from the following description of preferred embodiments thereof with reference to the attached drawings.

DETAILED DESCRIPTION OF THE INVENTION

Figure 1:
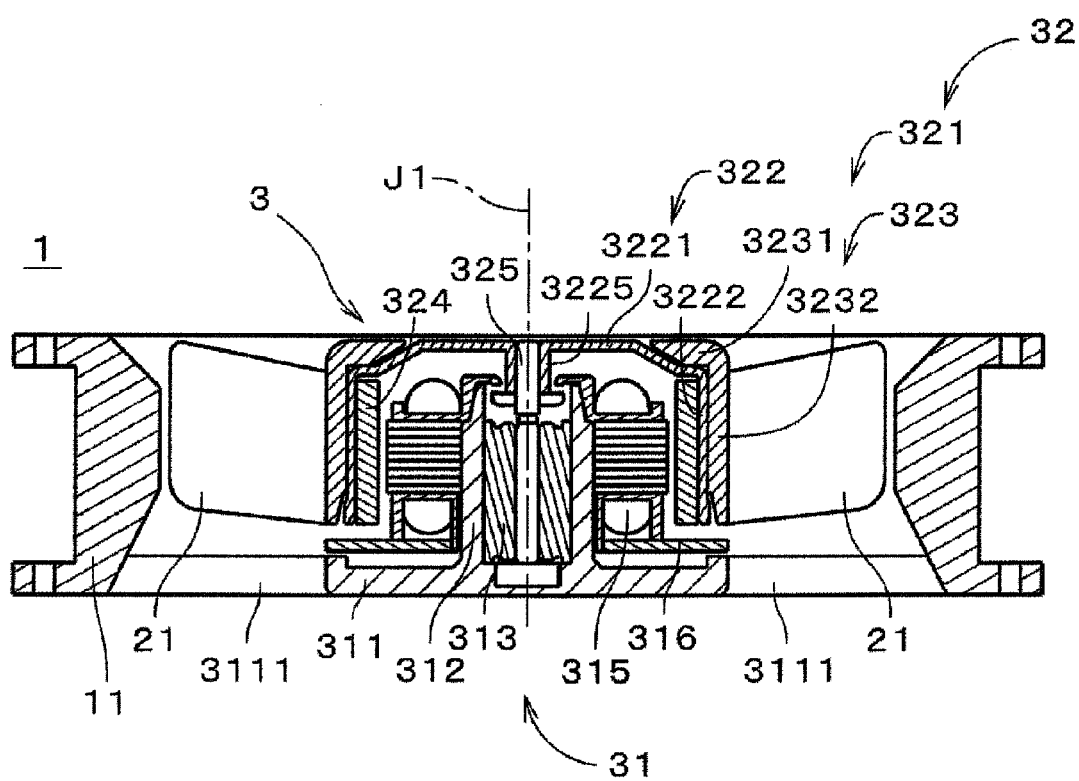
FIG. 1 is a schematic cross sectional view of a fan including a rotor holder according to a first preferred embodiment of the present invention.

Note that in the description of preferred embodiments of the present invention herein, words such as upper, lower, left, right, upward, downward, top, and bottom for describing positional relationships between respective members and directions merely indicate positional relationships and directions in the drawings. Such words do not indicate positional relationships and directions of the members mounted in an actual device. Also note that reference numerals, figure numbers, and supplementary descriptions are shown below for assisting the reader in finding corresponding components in the description of the preferred embodiments below to facilitate an understanding of the present invention. It is understood that these expressions in no way restrict the scope of the present invention.

FIG. 1 is a schematic cross sectional view of a fan 1 according to a first preferred embodiment of the present invention. As shown in FIG. 1, the fan 1 preferably includes a housing 11, a motor 3, and a plurality of blades 21 arranged in a radial manner centered about a central axis J1. Note that the fan 1 is used, for example, as a cooling fan which is used to cool electronic components and/or other heat generating elements in an electronic device. According to the housing 11 of the present preferred embodiment, one of the sides when seen from above is approximately 40 mm.

The motor 3 is preferably an outer rotor type motor including a stator portion 31 and a rotor portion 32. The rotor portion 32 is preferably supported in a rotatable manner with respect to the stator portion 31 centered about the central axis J1.

The stator portion 31 preferably includes a base portion 311 having a substantially discoid shape centered about the central axis J1. The base portion 311 is preferably affixed to the housing 11 via a plurality of ribs 3111. Also, the stator portion 31 preferably includes a bearing retaining portion 312 which includes a substantially cylindrical shape centered about the central axis J1 and protrudes upwardly from the base portion 311, and a sleeve 313 which is affixed to an inner side of the bearing retaining portion 312 and includes a substantially cylindrical shape centered about the central axis J1.

Further, the stator portion 31 preferably includes an armature 315 which is attached at an outer circumference of the bearing retaining portion 312, and a circuit board 316 which is arranged below the armature 315, includes a substantially annular shape, and is electrically connected to the armature 315 so as to control the drive current supplied to the armature 315.

The rotor portion 32 preferably includes a cup portion 321 which includes a substantially cylindrical shape with a lid centered about the central axis J1. The cup portion 321 preferably includes a rotor holder 322 which includes a substantially cylindrical shape with a lid centered about the central axis J1 and is made of a magnetic metal material. The rotor holder 322 preferably includes a top plate portion 3221 which includes a substantially discoid shape centered about the central axis J1, and a side wall portion 3222 which includes a substantially cylindrical shape centered about the central axis J1 and extends from an outer circumferential edge of the top plate portion 3221 in a downward direction substantially parallel with the central axis J1. Also, the rotor holder 322 preferably includes a shaft support portion 3225 which includes a substantially cylindrical shape extending from a substantially central portion of the top plate portion 3221 in a downward direction at which a shaft 325 (described below) is inserted. According to the present preferred embodiment, an external diameter of the rotor holder 322 is approximately 22.4 mm and an internal diameter of the rotor holder 322 is approximately 21.4 mm.

Also, the cup portion 321 preferably includes a hub 323 which includes a substantially cylindrical shape made of a resin material and is affixed to the rotor holder 322. The hub 323 preferably includes a hub top plate portion 3231 having a substantially annular shape centered about the central axis J1, and a hub side wall portion 3232 which includes a substantially cylindrical shape extending from an outer circumference of the hub top plate portion 3231 in a downward direction substantially parallel with the central axis J1. Note that an outer circumferential surface of the side wall portion 3222 of the rotor holder 322 is preferably covered by the hub side wall portion 3232. Also, an area surrounding the outer circumferential edge of the top plate portion 3221 of the rotor holder 322 is preferably covered by the hub top plate portion 3231. The plurality of blades 21 extend from the outer circumferential surface of the hub side wall portion 3232 in a radial direction centered about the central axis J1. According to the present preferred embodiment, the blades 21 and the hub 323 are preferably made of a same resin material in an integral manner as a single component.

The rotor portion 32 is preferably affixed at an inner side of the side wall portion 3222 of the rotor holder 322. The rotor portion 32 preferably includes a field magnet 324 having a substantially cylindrical shape radially opposed to the armature 315, and the shaft 325 which is secured to the top plate portion 3221 of the rotor holder 322 extending in a downward direction from the top plate portion 3221. The shaft 325 is preferably inserted into the sleeve 313 of the stator portion 31 and is rotatably supported by the sleeve 313. According to the motor 3 of the present preferred embodiment, the shaft 325 and the sleeve 313 preferably form a bearing mechanism supporting the cup portion 321 with respect to the base portion 311 in the rotatable manner centered about the central axis J1.

According to the fan 1 of the present preferred embodiment, a drive current is preferably supplied to the armature 315 via the circuit board 316 so as to generate a torque centered about the central axis J1 between the armature 315 and the field magnet 324 arranged radially opposed thereto. By virtue of such configuration, the cup portion 321 which include the blades 21 arranged at the outer circumferential surface of the hub side wall portion 3232 and the shaft 325 rotate centered about the central axis J1.

Figure 2:
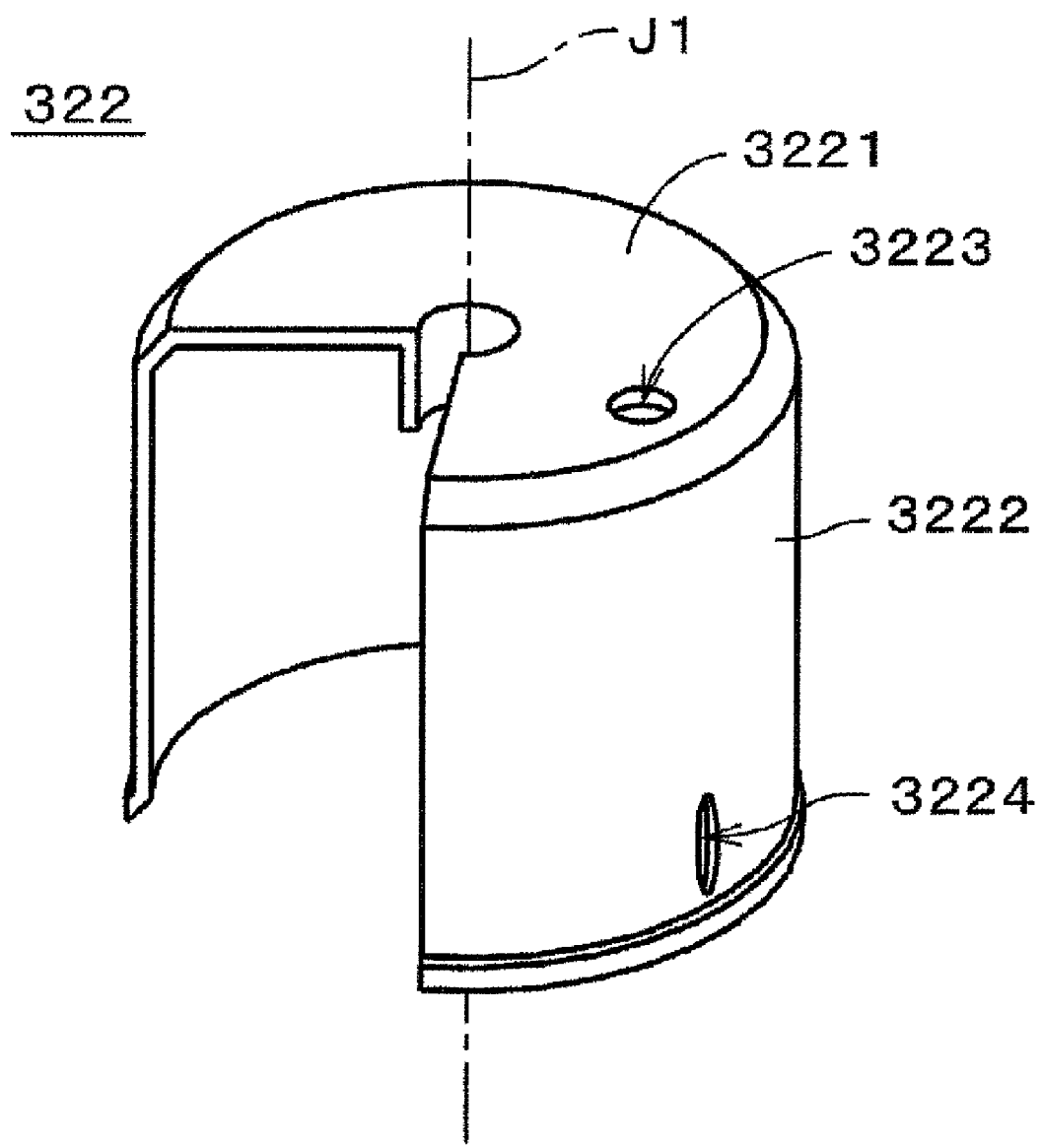
FIG. 2 is a schematic perspective view of the rotor holder of a motor.

FIG. 2 is a schematic perspective view of the rotor holder 322 of the motor 3. It is to be appreciated that FIGS. 2, 4C through 4G, 7 and 12 depict the rotor holder 322 with a portion thereof notched in order to better show the configuration thereof.

As shown in FIG. 2, the rotor holder 322 preferably includes a side wall portion through hole 3224 arranged as a balance adjuster for the rotor holder 322 maintaining its weight balance in the axial direction and the circumferential direction at an area of the metal plate 90 corresponding to the bottom end portion of the side wall portion 3222. Also, the rotor holder 322 preferably includes a top plate portion through hole 3223 arranged as a balance adjuster for the rotor holder 322 maintaining its weight balance in the axial and circumferential direction at an area of the metal plate 90 corresponding to the outer circumferential edge of the top plate portion 3221. Since the rotor holder 322 includes the side wall portion through hole 3224 and the top plate portion through hole 3223, the weight thereof in the axial direction and the circumferential direction is adjusted, whereby the weight balance thereof is adjusted (that is, the center of gravity is adjusted in accordance with the rotor holder 322).

Figure 3:
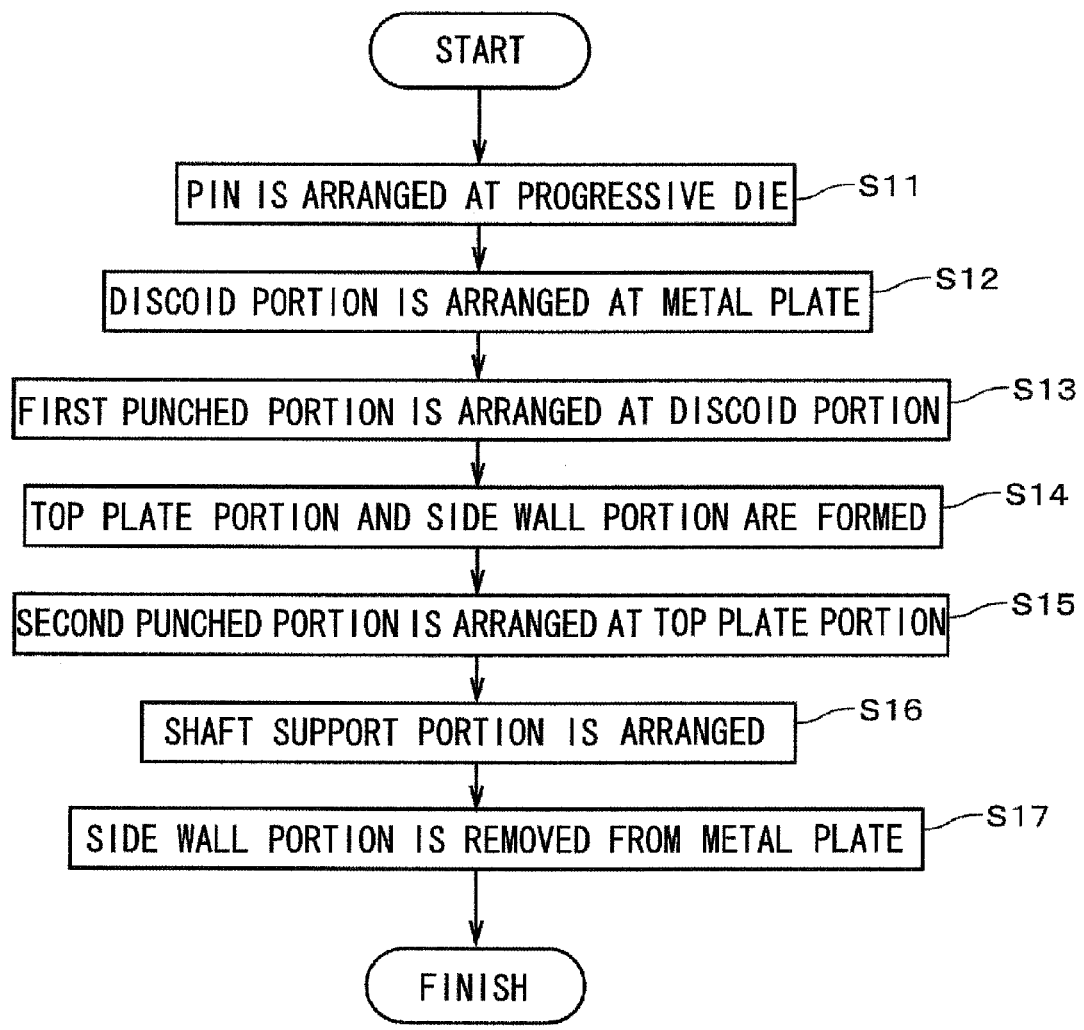
FIG. 3 is a flow chart illustrating a flow of steps taken to manufacture the rotor holder.

Next, a manufacturing method of the rotor holder 322 will be described. According to the present preferred embodiment, the rotor holder 322 is preferably formed from the metal plate 90 by pressing by a progressive die. The progressive die preferably includes a plurality of pairs of male and female dies which are arranged evenly apart from one another in a predetermined direction. The progressive die preferably moves the metal plate 90, out of which the rotor holders 322 are formed, while multiple pressings are simultaneously executed. FIG. 3 is a flow chart illustrating a flow of steps taken to manufacture the rotor holder 322. FIGS. 4A through 4G each are schematic perspective view of the rotor holder 322 during a manufacturing process thereof.

Figure 5A:
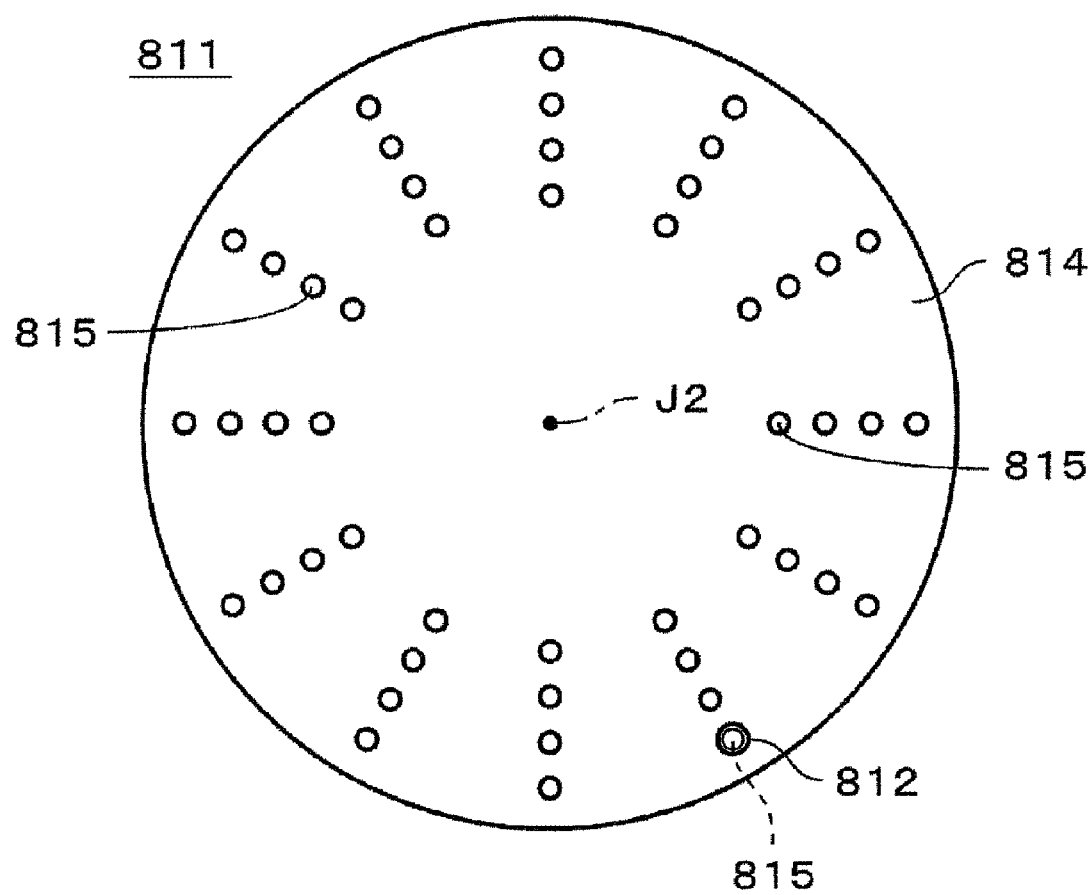
FIG. 5A is a schematic plan view of a portion of a progressive die.
Figure 5B:
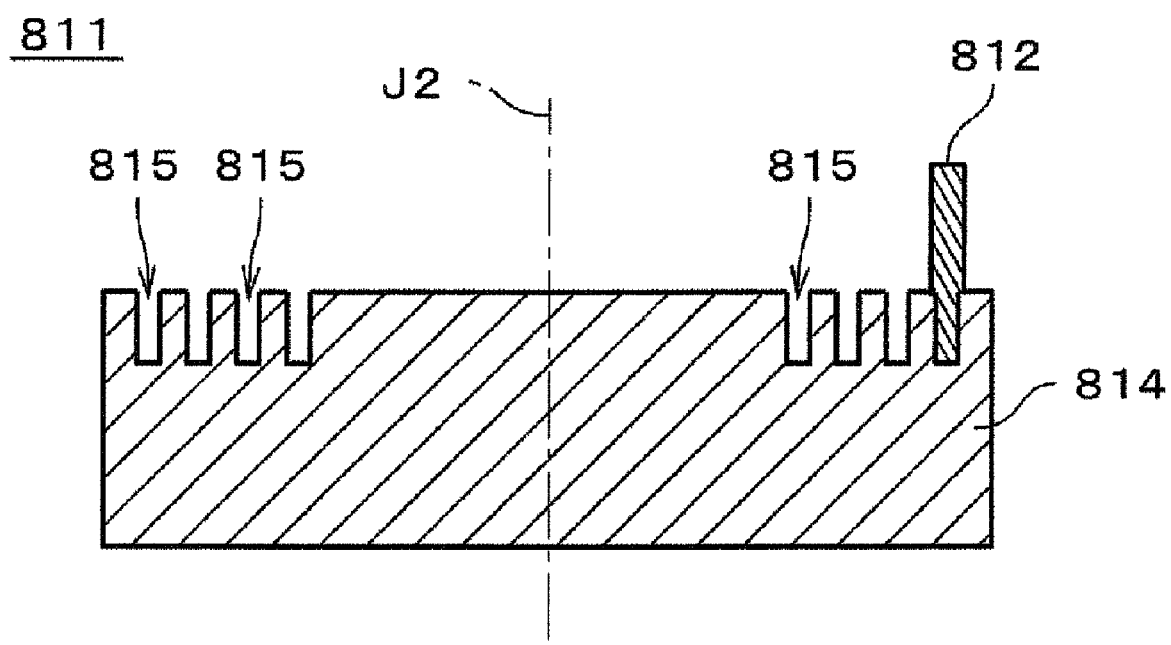
FIG. 5B is a schematic cross sectional view of the portion of the progressive die.

FIGS. 5A and 5B each are schematic view of a portion of the progressive die which is used to manufacture the rotor holder 322. To be more specific, FIG. 5A is a schematic plan view of a male die 811 which is used in step S13 (see FIG. 3, described below) of the manufacturing process described herein in which the side wall portion through hole 3224 (see FIG. 2) is arranged, while FIG. 5B is a schematic cross sectional view of the male die 811. FIG. 5B denotes a central axis J2 (which is coaxial with the central axis J1) of the male die 811, and a pin 812 (described below). Note that the male die which is used to arrange the top plate portion through hole 3223 includes a configuration similar to that of the male die 811.

The male die 811 preferably includes a columnar portion 814 and a plurality of holes 815 at which pin 812 maybe arranged. The holes 815 are preferably arranged in a substantially concentric manner. The pin 812 may be arranged at at least any one of the holes 815 so as to arrange a through hole on the metal plate 90 for a desirable balance of the final product (i.e., rotor holder 322). It is to be appreciated that the columnar portion 814 of the male die 811 may rotate centered about the central axis J2 in order to adjust the position of the pin 812.

Note that prior to manufacturing the rotor holders 322, a rotor holder (hereafter, "test rotor holder") which includes no top plate portion through hole 3223 and the side wall portion through hole 3224 is formed by the progressive die in order to determine the weight balance thereof. The manufacturing process for the test rotor holder is identical with that (that is, steps S12 to S17, described below) of the rotor holders 322 except that steps S13 and S15 are not carried out.

The test rotor holder is tested in terms of its weight balance in the axial direction and its weight balance in the direction perpendicular to the axial direction. Then, based on the outcome of the test, locations (i.e., eccentric position in the axial and circumferential directions) and dimensions of the top plate portion through hole 3223 and the side wall portion through hole 3224 are determined.

Then the pin 812 having the most appropriate diameter in accordance with the test outcome is selected and arranged at the male die 811 (see FIGS. 5A and 5B) of the progressive die (step S11). Note that a distance between the hole 815 at which the pin 812 is arranged and the central axis J2 of the male die 811 is determined in accordance with the position of the side wall portion through hole 3224 to be arranged in the final product with respect to the central axis J1.

Figure 4A:
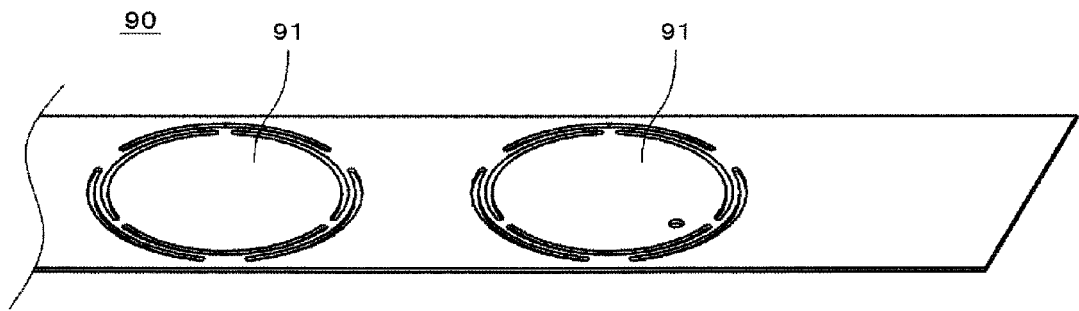
FIG. 4A is a schematic perspective view of the rotor holder during a manufacturing process thereof.

Then, the metal plate 90 shown in FIG. 4A is supplied to the progressive die in which an area surrounding each of a plurality of discoid portions 91 (see FIGS. 4A and 4B) is all but removed. By this, the discoid portions 91 are sequentially formed while the metal plate 90 and the portions thereof to be the rotor holder 322 remain connected (step S12).

Hereafter the manufacturing process of the rotor holder 322 will be described in detail with reference to the flowchart in FIG. 3. Note that while multiple processes are simultaneously carried out at the progressive die with respect to portions of the metal plate 90, the description will be made with respect to a specific portion of the metal plate 90 at which the discoid portion 91 is formed.

Figure 4B:
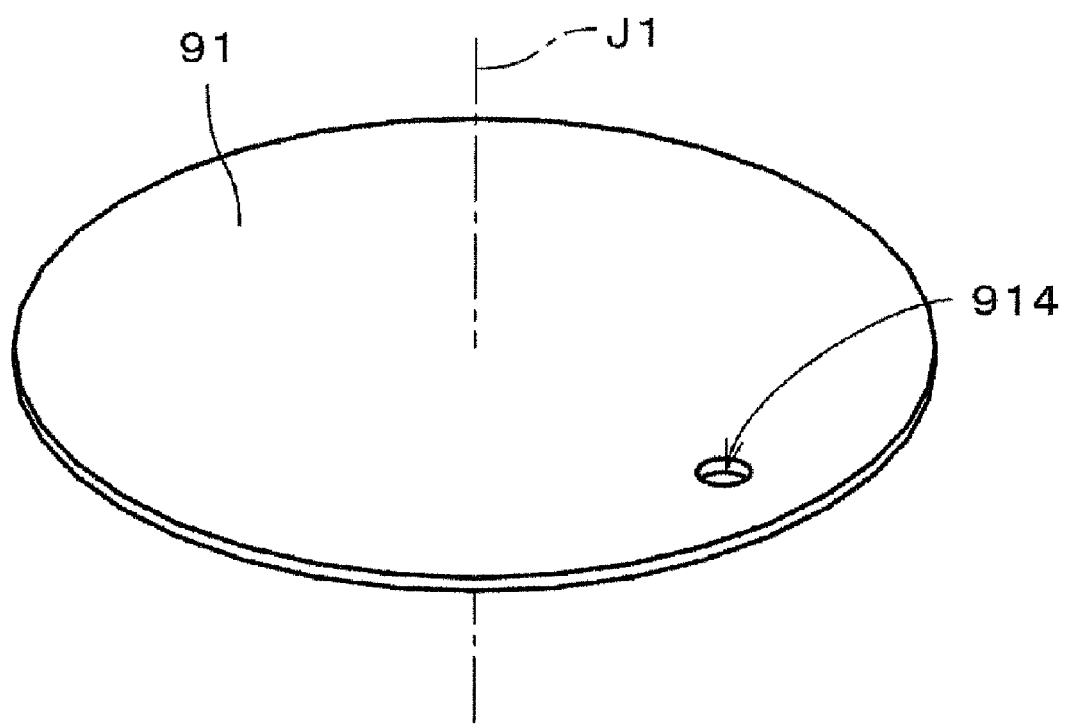
FIG. 4B is a schematic perspective view of the rotor holder during a manufacturing process thereof.

After the discoid portion 91 is formed, pressing is carried out by the male die 811 and the corresponding female die (not shown) to the discoid portion 91. To be more specific, a portion near the outer circumferential edge of the discoid portion 91 at the metal plate 90 that is a portion corresponding to the side wall portion 3222 of the rotor holder 322 will be punched out. Then, as shown in FIG. 4B, the first punched portion 914 which is a through hole having a substantially round shape is formed at the portion corresponding to the side wall portion through hole 3224 (step S13). Note that, a substantially platelike stripper plate (not shown) is arranged between the metal plate 90 and the corresponding female die in order to facilitate the pressing procedure. Also note the first punched portion 914 may be formed at the same time the discoid portion 91 is formed (i.e., step S12). Also note that a second punched portion (described below) which is arranged at a portion of the metal plate 90 corresponding to the top plate portion through hole 3223 may be formed at the same time the first punched portion 914 is formed.

Figure 4C:
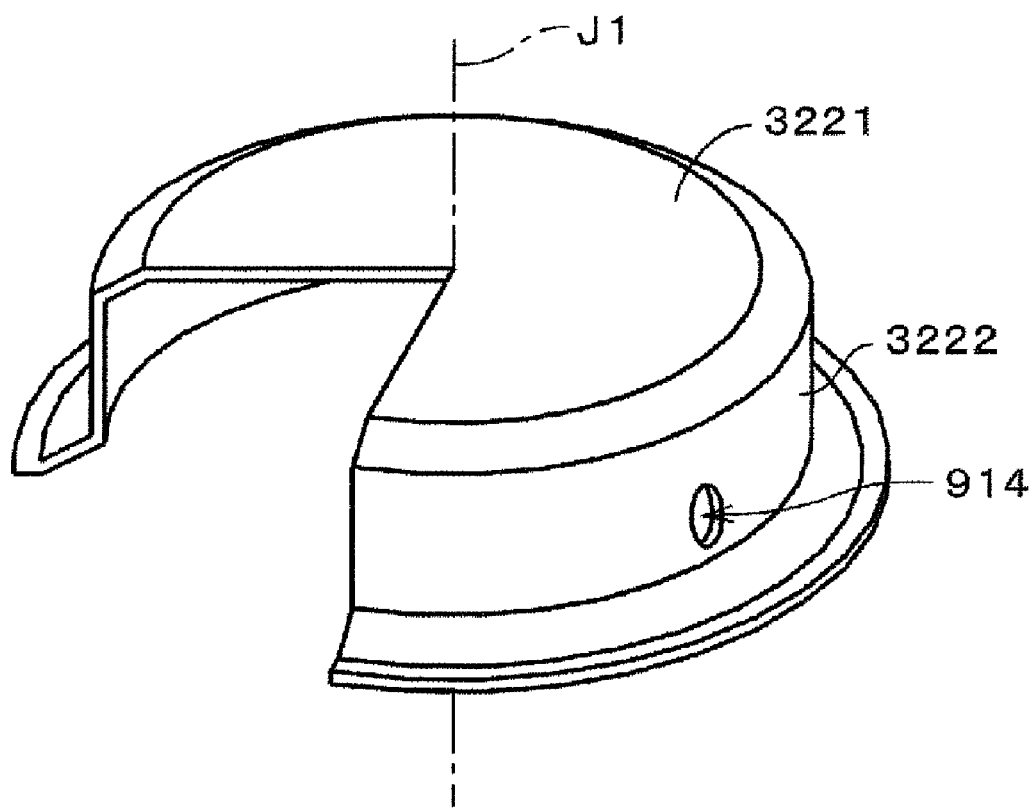
FIG. 4C is a schematic perspective view of the rotor holder during a manufacturing process thereof.

Once the first punched portion 914 is formed, the metal plate 90 is moved so that the discoid portion 91 is arranged at the next position of the progressive die. Then, a first drawing is carried out to the discoid portion 91 in order to form the top plate portion 3221 and the side wall portion 3222 of the rotor holder 322 as shown in FIG. 4C. Then, the rotor holder 322 is moved to a following die for a second and third drawing in order to form the top plate portion 3221 and the side wall portion 3222 as shown in FIGS. 4D and 4E (step S14).

Figure 4D:
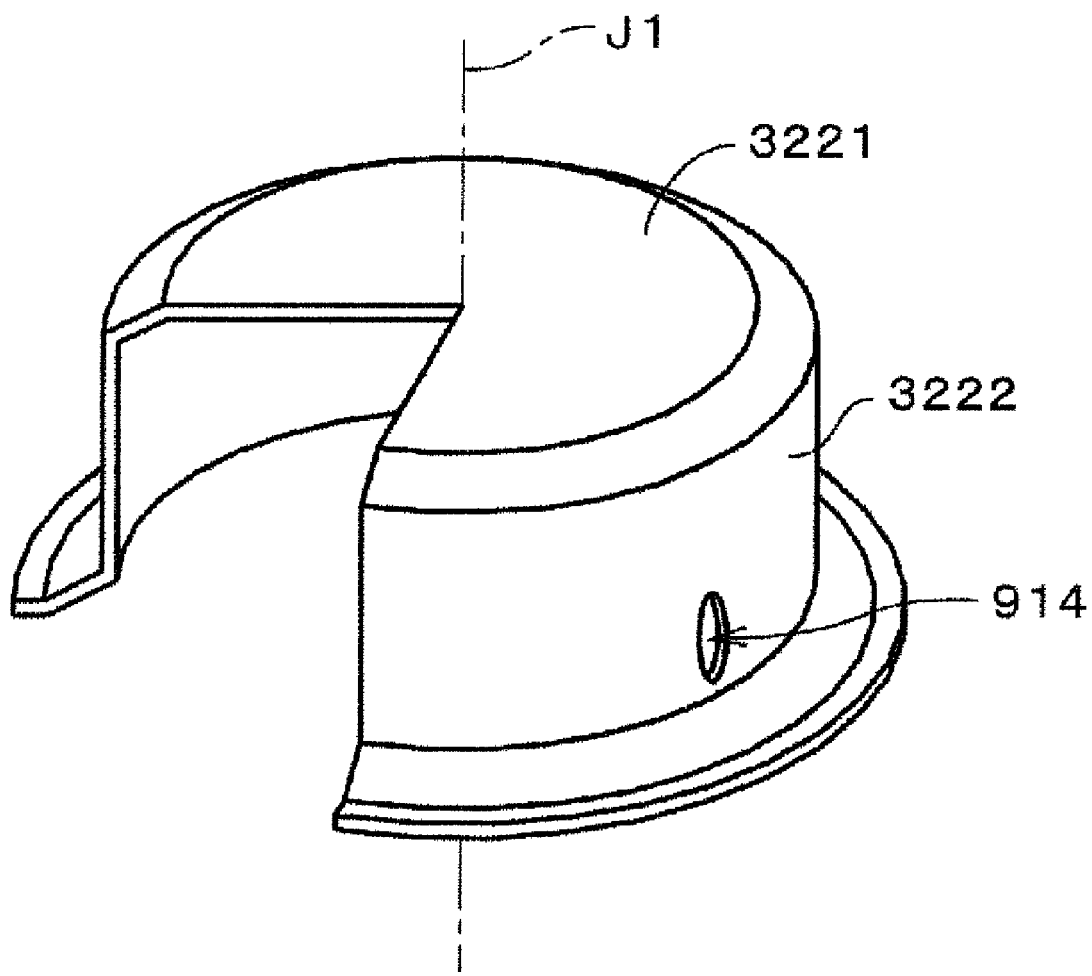
FIG. 4D is a schematic perspective view of the rotor holder during a manufacturing process thereof.
Figure 4E:
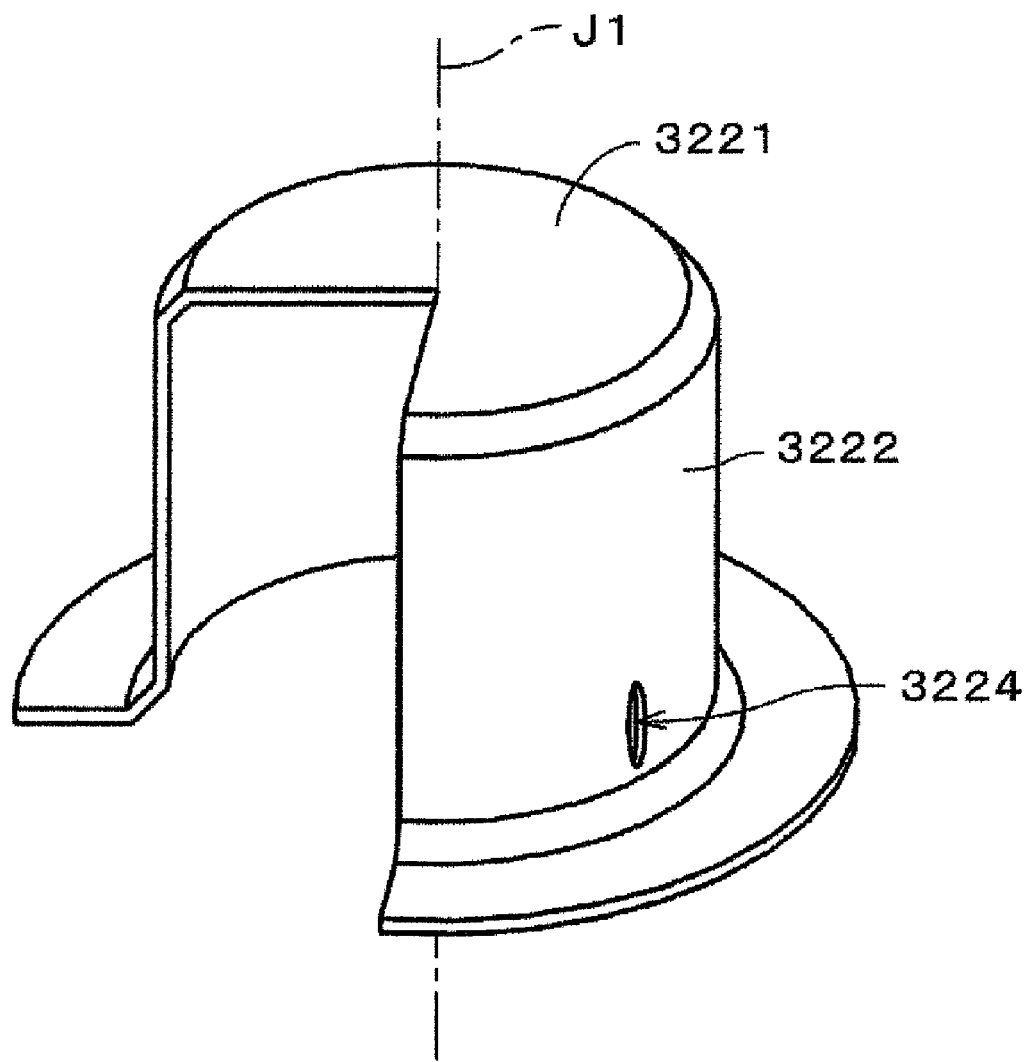
FIG. 4E is a schematic perspective view of the rotor holder during a manufacturing process thereof.
Figure 4F:
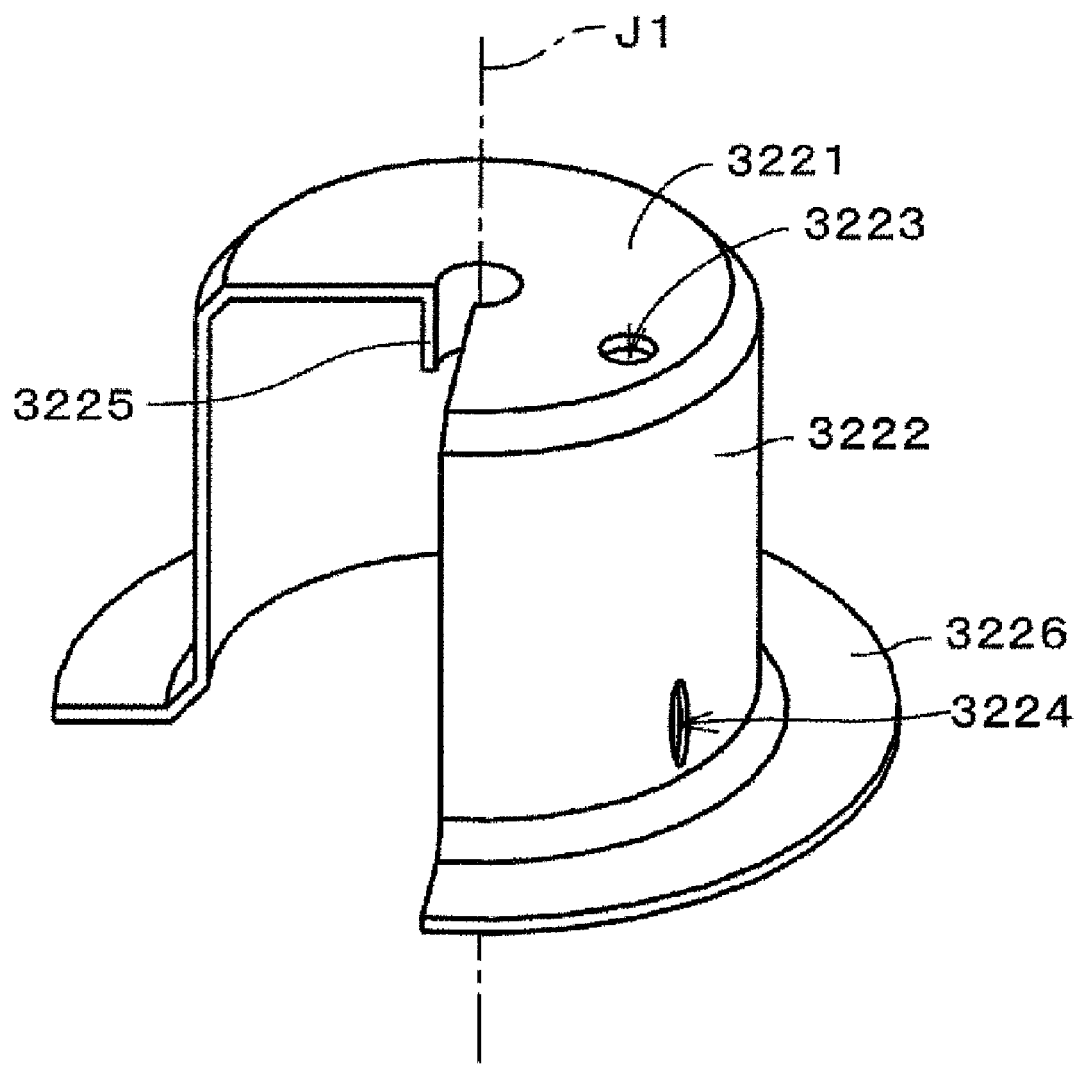
FIG. 4F is a schematic perspective view of the rotor holder during a manufacturing process thereof.
Figure 6:
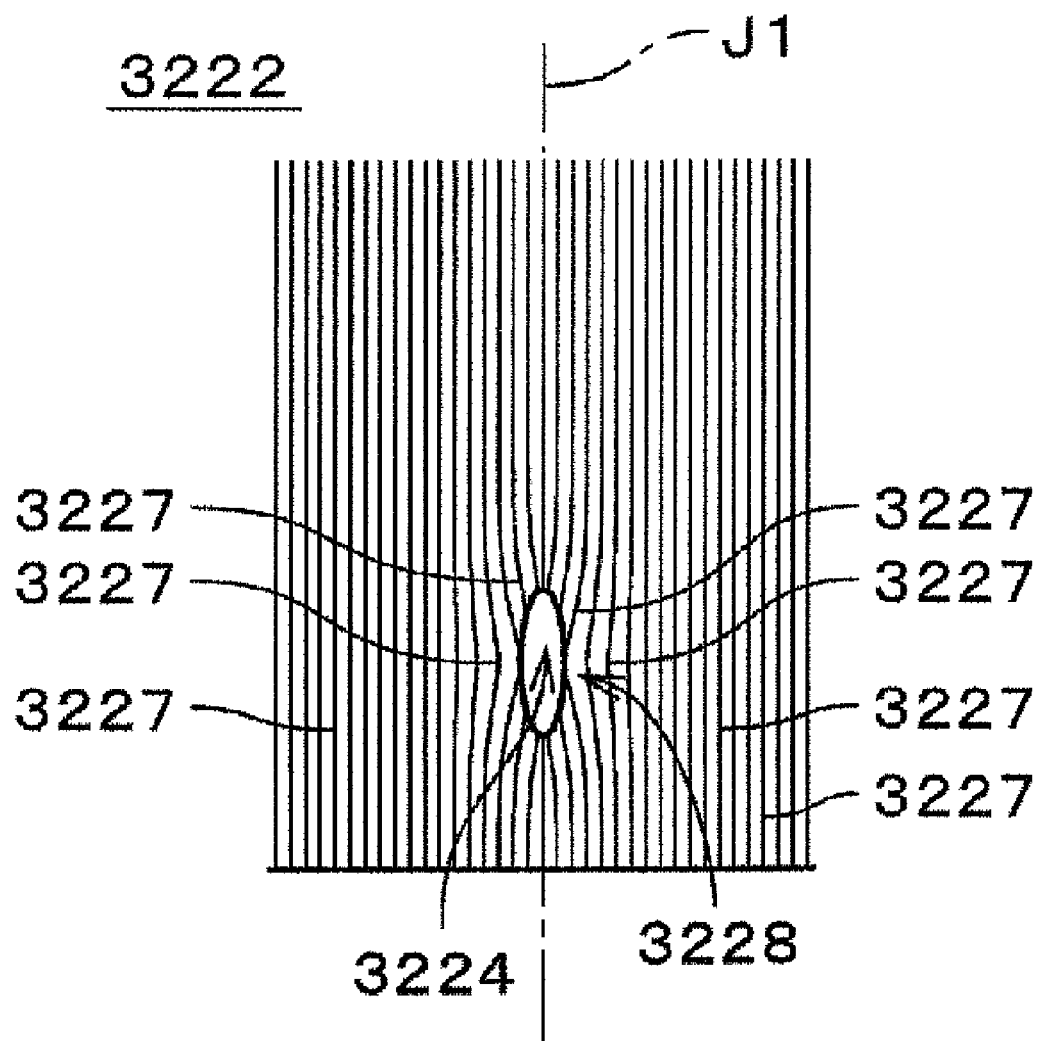
FIG. 6 is a schematic enlarged view of a through hole and an area surrounding the through hole arranged at a side wall portion of the rotor holder.

As shown in FIGS. 4C, 4D and 4E, the first punched portion 914 and a portion surrounding the first punched portion 914 will be deformed due to the aforementioned drawings. To be more specific, the first punched portion 914 becomes longer in the axial direction and shorter in the radial direction as shown in FIG. 6. Note that the first punched portion 914 after being deformed due to the drawings as described above will be referred to as the side wall portion through hole 3224 having a substantially oval shape.

FIG. 6 is a schematic enlarged view of the side wall portion through hole 3224 and its surrounding area arranged at the side wall portion 3222 of the rotor holder 322. As shown in FIG. 6, a metal grain flow 3227 in a direction substantially parallel with the axial direction is formed at the side wall portion 3222 due to drawing procedures as described above. Also, due to the drawings, the area surrounding the first punched portion 914 is deformed such that the metal grain flow 3227 is deformed accordingly. A portion of the metal grain flow 3227 which is deformed toward substantially the center of the first punched portion 914 will be referred to as the metal grain flow centered portion 3228.

Since the metal grain flow 3227 is curved toward the side wall portion through hole 3224 at the metal grain flow centered portion 3228, a space between the vertical lines of the metal grain flow 3227 shown in FIG. 6 is widened at the axially central area of the side wall portion through hole 3224. Also, a space between the vertical line of the metal grain flow 3227 is narrowed at axial ends of the side wall portion through hole 3224. It is to be appreciated that depending on a level of pressure applied to the metal plate 90, the pattern of the metal grain flow 3227 may be varied.

Figure 4G:
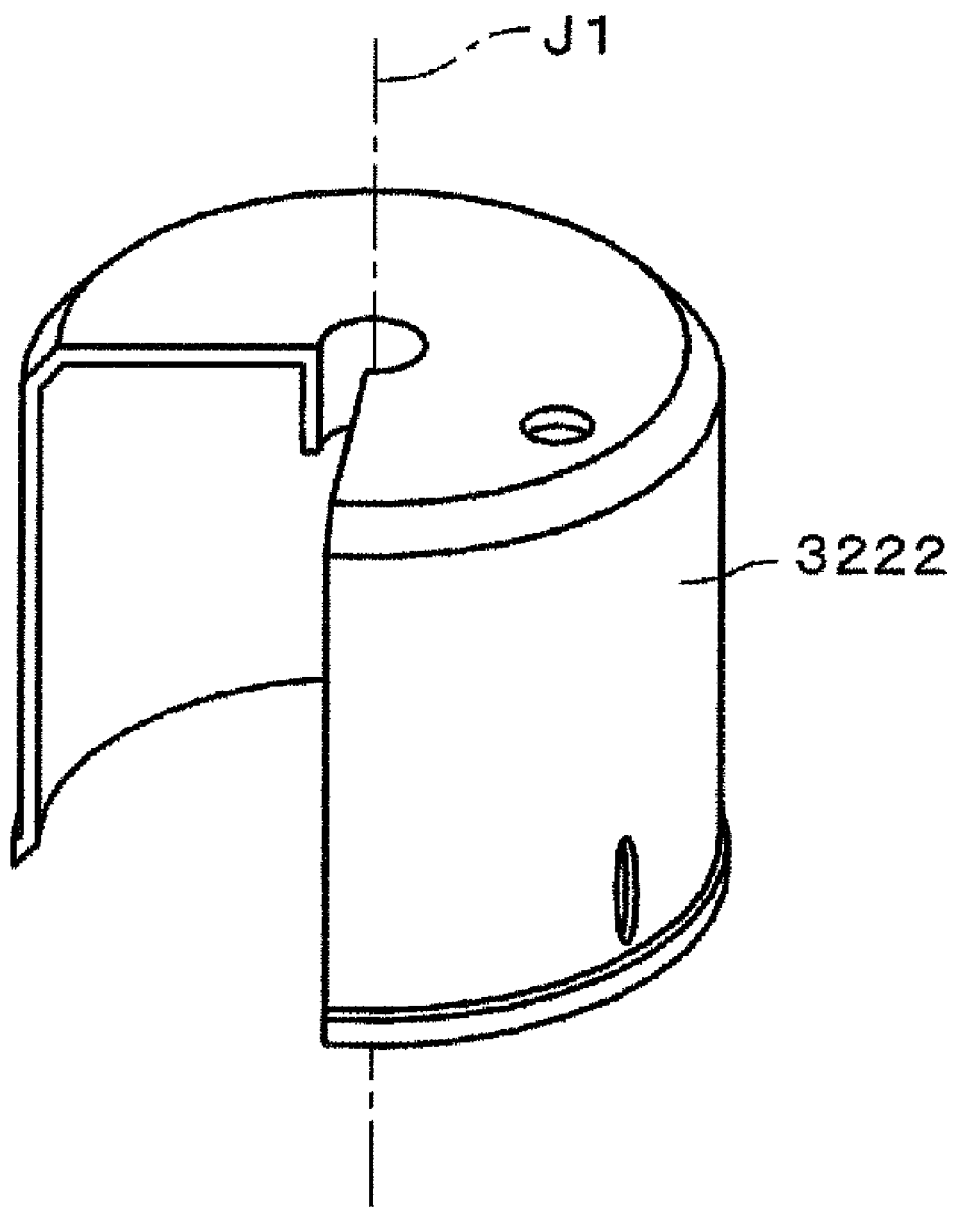
FIG. 4G is a schematic perspective view of the rotor holder during a manufacturing process thereof.

After the drawing process described above, the second punched portion (i.e., the top plate portion through hole 3223) is formed (step S15). Then, an opening is arranged at a substantially central area of the top plate portion 3221, and a burring is carried out thereto so as to form the shaft support portion 3225 (step S16). The shaft support portion 3225 preferably includes a substantially cylindrical shape and protrudes downwardly. Then, an annular portion 3226 (see FIG. 4F) preferably extending from a lower end of the side wall portion 3222 in a perpendicular manner with respect to the central axis J1 is removed therefrom by trimming or the like so as to remove the side wall portion 3222 as shown in FIG. 4G from the metal plate 90 (see FIG. 4A) thereby completing the forming of the rotor holder 322 (step S17).

As described above, according to the manufacturing method of the rotor holder 322 of the motor 3 of the present preferred embodiment, the rotor holder 322 including the top plate portion 3221 and the side wall portion 3222 is formed by performing a series of pressings on the metal plate 90 by the progressive die. Also, the side wall portion through hole 3224 is formed by performing a series of pressings by the progressive die. By virtue of such method, the side wall portion through hole 3224 which is arranged in order to adjust the weight balance of the rotor holder 322 is formed at the side wall portion 3222 easily. Further, it becomes possible to effectively form the side wall portion through hole 3224 during the manufacturing process of the rotor holder 322 (i.e., not after the rotor holder has already been manufactured). Consequently, a rotor holder having a good balance in the circumferential direction is effectively and speedily manufactured.

According to the manufacturing method of the present preferred embodiment, the top plate portion through hole 3223 is effectively and speedily formed at the top plate portion 3221 while manufacturing the rotor holder 322 by the progressive die. Consequently, a rotor holder having a good balance in the circumferential direction is effectively and speedily manufactured. Also, the weight balance of the rotor holder 322 in terms of the axial and circumferential directions is achieved by the side wall portion through hole 3224 and the top plate portion through hole 3223.

As described above, since the rotor holder 322 which is manufactured as described above is operable to rotate concentrically with the central axis J1 of the rotor holder 322, vibrations potentially caused by an unbalanced rotor holder 322 when the rotor portion 32 rotates are minimized.

Further, since the weight balance of the rotor holder 322 in the axial direction is adjusted by arranging the side wall portion through hole 3224 and the top plate portion through hole 3223, a center of rotation of the rotor portion 32 having the blades 21 preferably and substantially aligns with a center of dynamic pressure generated at a radial bearing portion which is a bearing unit of the fan 1 when the motor 3 rotates. Consequently, vibrations of the rotor holder 322 are minimized.

Note when the rotor holder 322 is not seemingly misaligned with the central axis J1 after the side wall portion 3222 through hole 3224 and the top plate portion through hole 3223 are arranged at corresponding portions of the rotor holder 322, the field magnet 324 which is arranged at an inner circumferential surface of the side wall portion 3222 of the rotor holder 322 is arranged at a corresponding portion of the inner circumferential surface of the side wall portion 3222 so as to compensate for the misalignment. Consequently, vibrations of the rotor holder 322 are minimized.

Also, when the hub 323 which is formed integrally as a single member with the blades 21 is affixed at the outer circumferential surface of the side wall portion 3222, the hub 323 including the blades 21 is arranged so as to compensate for the misalignment of the rotor holder 322 in order to achieve the balance of the fan 1. Consequently, vibrations of the rotor holder 322 are minimized.

During the assembling of the fan 1 when the field magnet 324 is attached to the rotor holder 322, and when the hub 323 is attached to the rotor holder 322, the top plate portion through hole 3223 and the side wall portion through hole 3224 are used as reference point. Therefore, an additional reference point will not be required at the rotor holder 322 which simplifies the manufacturing process of the motor 3 and the fan 1.

According to the rotor holder 322, the side wall portion through hole 3224 is preferably arranged at the bottom end portion of the side wall portion 3222. It is to be appreciated that when a distance between the side wall portion through hole 3224 and the top plate portion through hole 3223 in the axial direction is great as described above, the axial weight balance of the rotor holder 322 is improved.

According to the manufacturing method of the rotor holder 322 as described above, since forming of the first punched portion 914 which becomes the side wall portion through hole 3224 (i.e., step S13) is carried out prior to the drawing process in which the side wall portion 3222 and the top plate portion 3221 are formed (i.e., step S14), the circumferential width of the first punched portion 914 is modified by step S14 so as to reduce the dimension of the side wall portion through hole 3224. By this, leakage of a magnetic flux from the field magnet 324 via the side wall portion through hole 3224 is minimized, whereby improving the characteristics of the motor 3. Also, since the dimension of the side wall portion is reduced, when the field magnet 324 is attached to the inner circumferential surface of the side wall portion 3222 via adhesive, the application of the adhesive may be carried out freely.

Note that according to the manufacturing method of the rotor holder 322 according to the present invention, a transfer press die may be used instead of the above described progressive die. By using the transfer press die, the plurality of rotor holders 322 are manufactured speedily and accurately.

Hereafter, a fan 1A according to a second preferred embodiment of the present invention will be described. A configuration of the fan 1A is substantially identical with that of the fan 1 according to the second preferred embodiment except that the fan 1A includes no side wall portion through hole at a side wall portion of a rotor holder thereof. Note that in the description of the second preferred embodiment herein, elements similar to those described in the first preferred embodiment are denoted by similar reference numerals, and description thereof is omitted.

Figure 7:
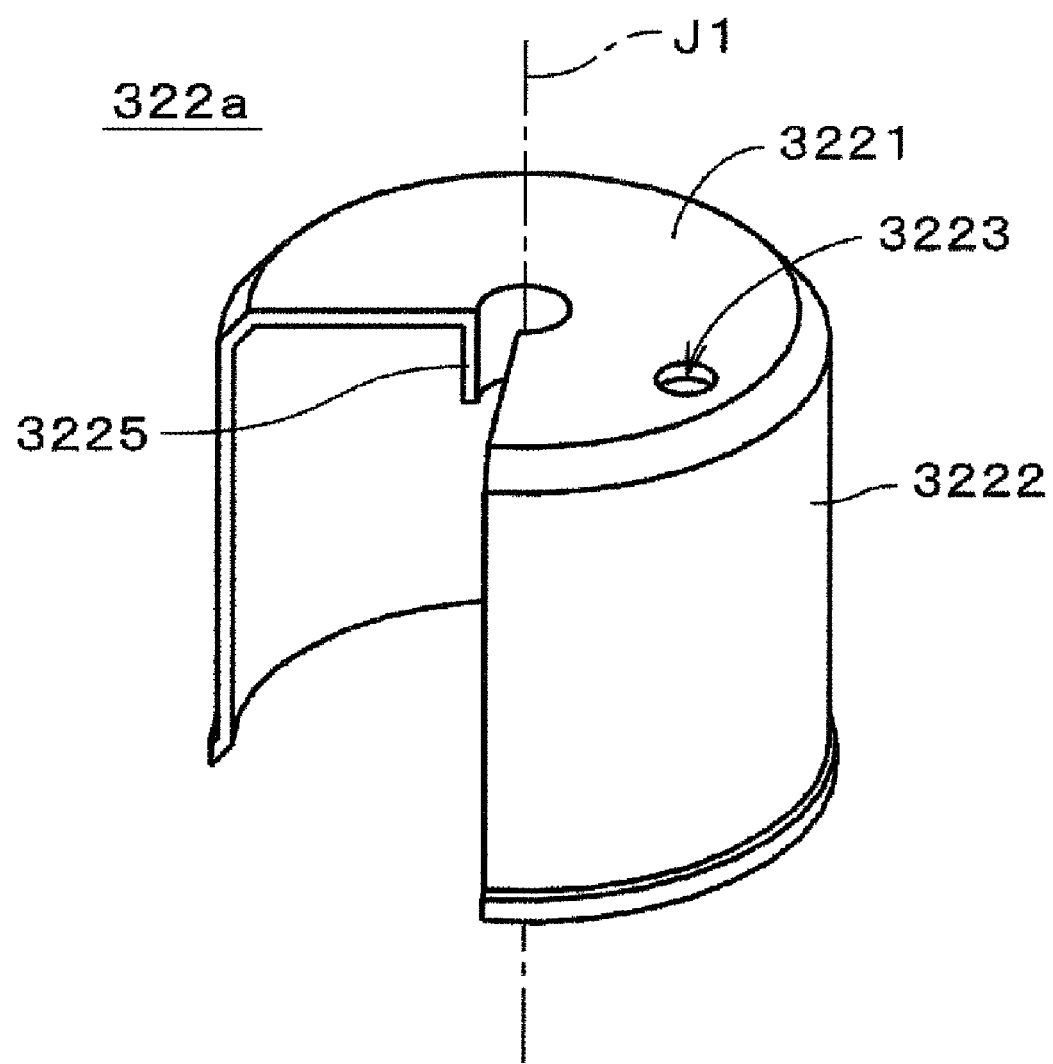
FIG. 7 is a schematic perspective view of a rotor holder according to a second preferred embodiment of the present invention.

FIG. 7 is a schematic perspective view of a rotor holder 322a of the fan 1A according to the second preferred embodiment. Note that according to the rotor holder 322a, a portion surrounding the first punched portion 914 is deformed toward substantially the center of the first punched portion 914 during the drawing carried out in step S14 such that the first punched portion 914 is substantially closed. That is, the first punched portion 914 is substantially open as a passage of air or the like, however, is substantially closed for naked eyes to recognize it as a hole.

Figure 8:
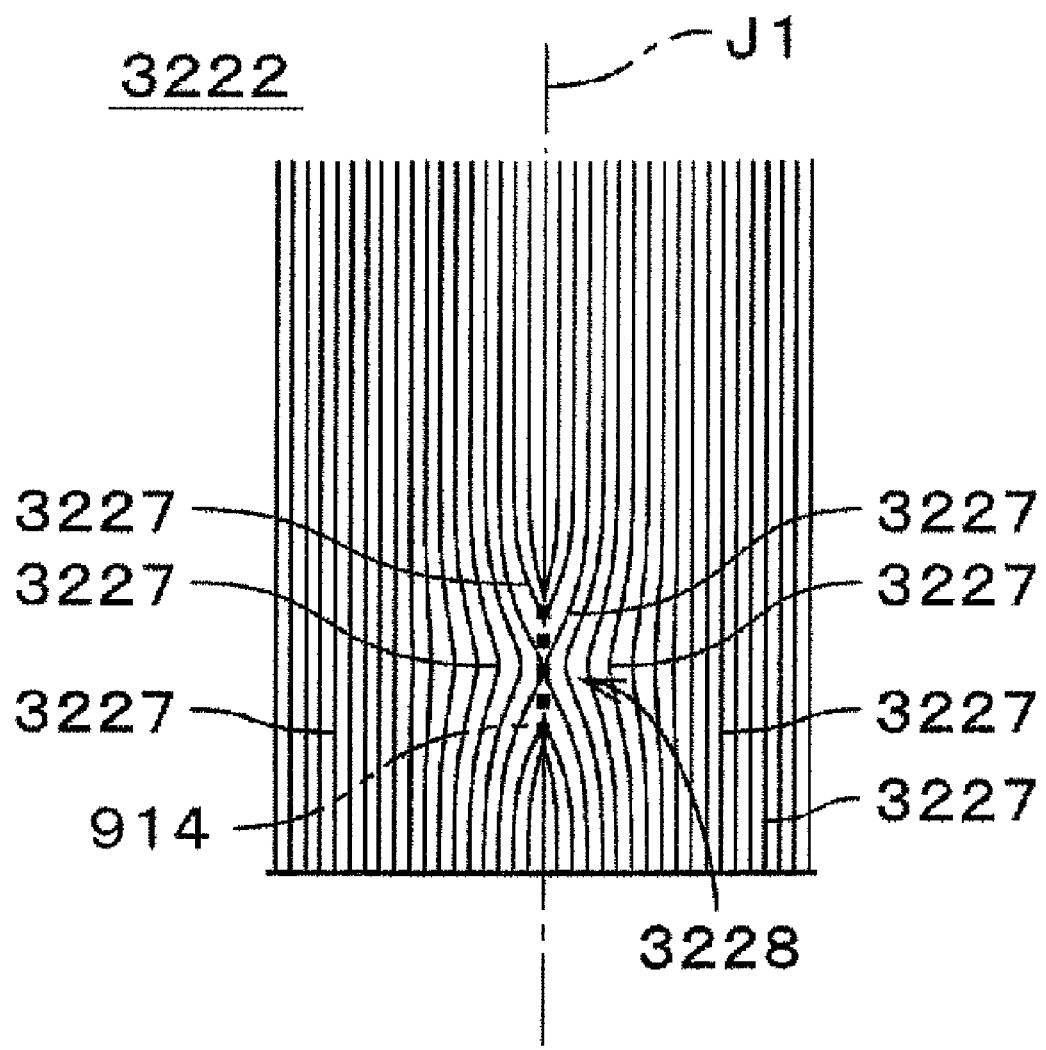
FIG. 8 is a schematic enlarged view of a side wall portion of the rotor holder including a first punched portion.

FIG. 8 is a schematic enlarged view of a portion of the side wall portion 3222 of the rotor holder 322a corresponding to the first punched portion 914. A broken line shown in FIG. 8 indicates the portion of the side wall portion 3222 at which the first punched portion 914 was arranged and was substantially closed. FIG. 8 also shows the metal grain flow 3227 by a plurality of substantially vertical lines. As shown in FIG. 8, the metal grain flow 3227 is substantially parallel with the central axis J1 at the side wall portion 3222, and is deformed toward substantially the center of the first punched portion 914 at the portion near the first punched portion 914. Also, due to the drawings, the area surrounding the first punched portion 914 is deformed such that the metal grain flow 3227 is deformed accordingly. A portion of the metal grain flow 3227 which is deformed toward substantially the center of the first punched portion 914 will be referred to as the metal grain flow centered portion 3228.

Since the rotor holder 322a according to the present preferred embodiment includes the metal grain flow centered portion 3228 and the top plate portion through hole 3223, the weight thereof in the axial direction and the circumferential direction is adjusted, whereby the weight balance thereof is adjusted (that is, the center of gravity is adjusted in accordance with the rotor holder 322).

Note that according to the manufacturing method of the rotor holder 322a according to the present preferred embodiment, a transfer press die may be used instead of the above described progressive die. Also, according to the manufacturing method of the rotor holder 322a of the second preferred embodiment, the metal grain flow centered portion 3228 which is used to adjust the weight balance of the rotor holder 322a is formed at the corresponding portion of the side wall portion 3222 effectively during the pressing processes on the metal plate by the progressive die. By this, the rotor holder 322a which is well-balanced in the circumferential direction is manufactured effectively. Also, since the progressive die is used to carry out the pressings, the top plate portion through hole 3223 is properly arranged at the corresponding portion of the top plate portion 3221 effectively. By this, the rotor holder 322a which is well-balanced in the circumferential and axial directions is manufactured effectively.

Consequently, it becomes possible to minimize the vibrations of the rotor portion 32 which may be caused by rotationally unbalanced rotor holder 322a.

According to the rotor holder 322a of the present preferred embodiment, the metal grain flow centered portion 3228 is arranged at the bottom end portion of the side wall portion 3222. By virtue of such configuration, the rotor holder 322a having the metal grain flow centered portion 3228 and the top plate portion through hole 3223 is operable to achieve the proper axial weight balance.

According to the manufacturing method of the rotor holder 322a of the present preferred embodiment, since the forming of the first punched portion 914 (i.e., step S13) is carried out prior to the forming of the side wall portion 3222 and the top plate portion 3221 (i.e., step S14) by the drawing process, the circumferential width of the first punched portion 914 may be reduced by the drawing process. By virtue of such configuration, the characteristics of the motor 3 is improved in that the magnetic flux of the field magnet 324 will be prevented from leaking out of the side wall portion 3222. Also, since the dimension of the side wall portion 3222 is reduced, when the field magnet 324 is arranged at the inner circumferential surface of the side wall portion 3222 of the rotor holder 322 via adhesive, the application of the adhesive may be carried out freely.

Figure 9:
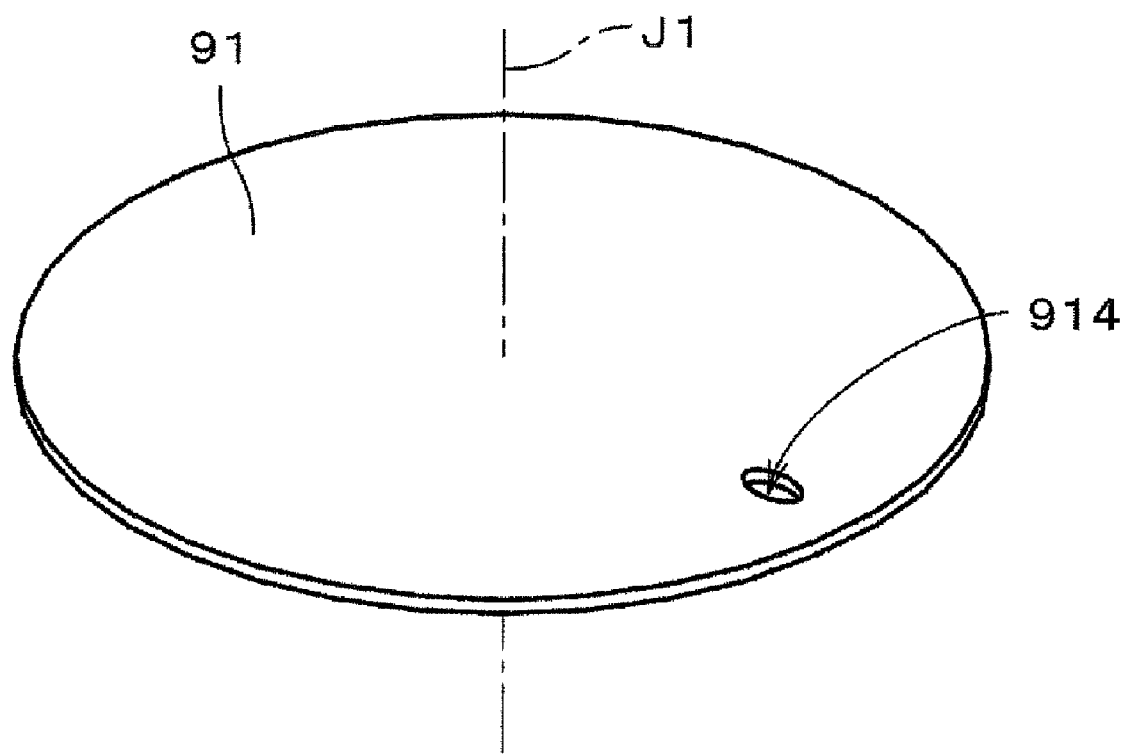
FIG. 9 is a schematic perspective view of a discoid portion.

According to the manufacturing method of the rotor holder 322a of the present preferred embodiment, the first punched portion 914 formed at the discoid portion 91 in step S13 may include a substantially oval shape as shown in FIG. 9 in which case, it becomes easier to securely close the circumferential width of the first punched portion 914 during the drawing process.

Figure 10:
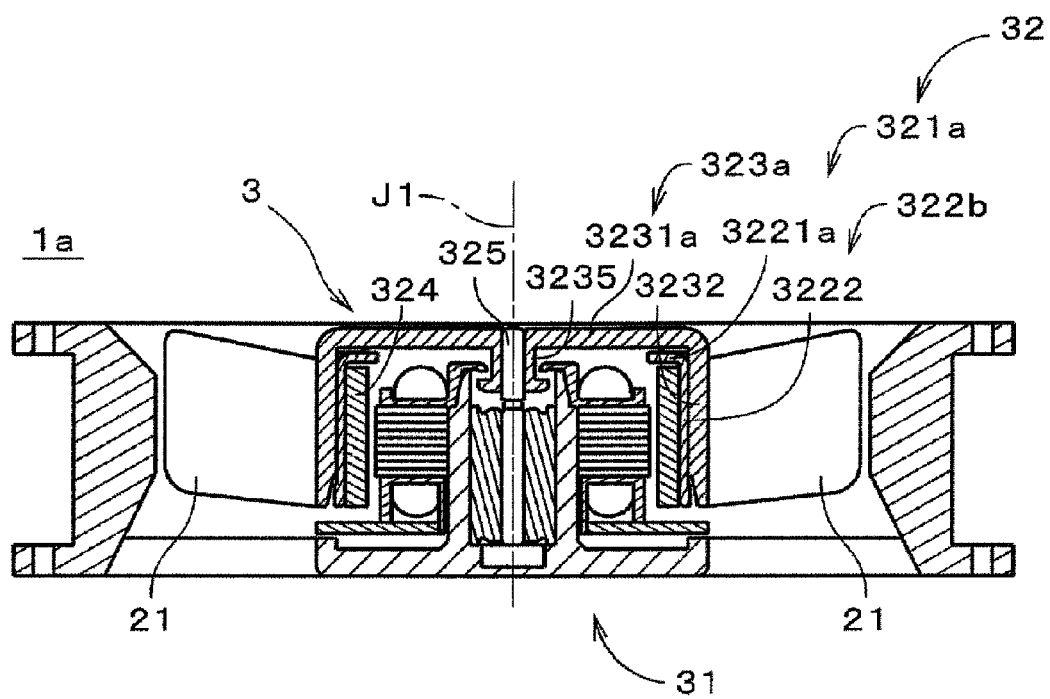
FIG. 10 is a schematic cross sectional view of a fan including a rotor holder according to a third preferred embodiment of the present invention.

Hereafter, a fan B according to a third preferred embodiment of the present invention will be described. FIG. 10 is a schematic cross sectional view of the fan B according to the third preferred embodiment. A configuration of the fan B is substantially identical with that of the fan 1 according to the fan 1 shown in FIG. 1 except that the fan B includes a cup portion 321a which is shaped differently than the cup portion 321 of the fan 1. Note that in the description of the third preferred embodiment herein, elements similar to those described in the first preferred embodiment are denoted by similar reference numerals, and description thereof is omitted.

As shown in FIG. 10, the cup portion 321a of the fan B preferably includes a rotor holder 322b which includes a substantially cylindrical shape centered about the central axis J1 and is made of a magnetic metal material, and a hub 323 which includes a substantially cylindrical shape, is made of a resin material and is affixed to the rotor holder 322b. The rotor holder 322b preferably includes a top plate portion 3221a having a substantially annular shape centered about the central axis J1, and a side wall portion 3222 which includes a substantially cylindrical shape extending from an outer circumferential edge of the top plate portion 3221a in a downward direction substantially parallel with the central axis J1.

The hub 323a preferably includes a hub top plate portion 3231a having a substantially annular shape centered about the central axis J1, and a hub side wall portion 3232 which includes a substantially cylindrical shape extending from an outer circumference of the hub top plate portion 3231a in a downward direction substantially parallel with the central axis J1. Also, the hub 323a preferably includes a shaft support portion 3235 which includes a substantially cylindrical shape extending from a substantially central portion of the hub top plate portion 3231a at which the shaft 325 is arranged.

Figure 11:
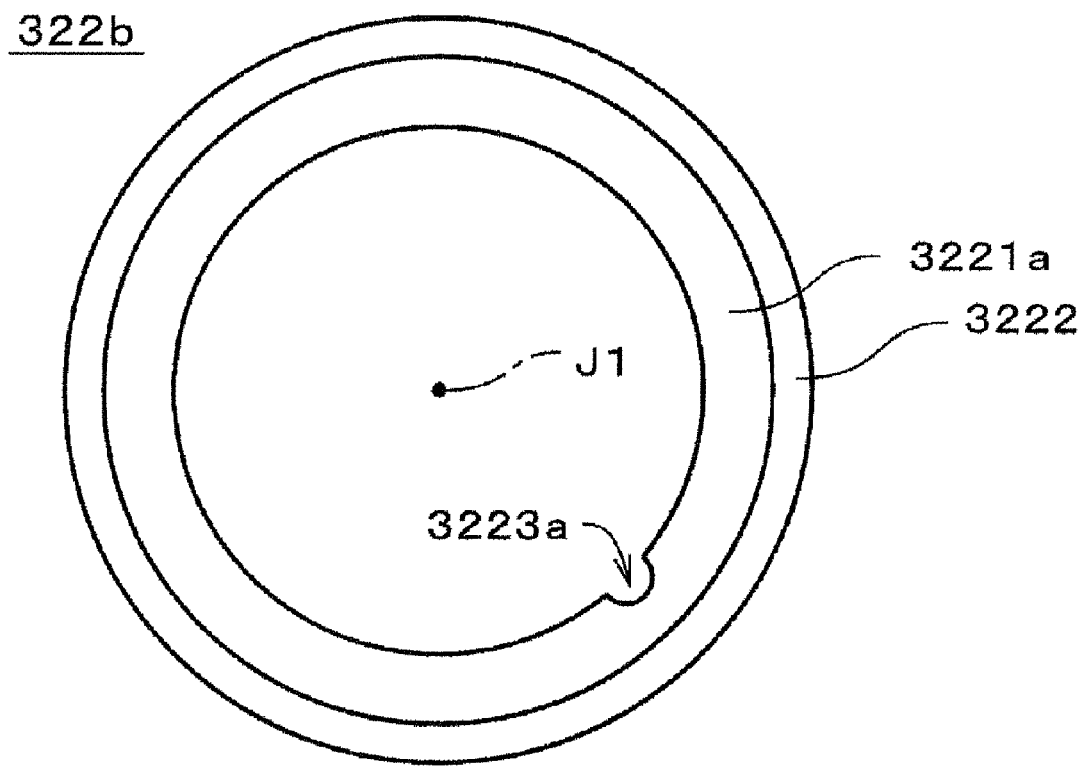
FIG. 11 is a schematic bottom view of the rotor holder according to the third embodiment.

FIG. 11 is a schematic bottom view of the rotor holder 322b according to the present preferred embodiment. As shown in FIG. 11, the rotor holder 322b preferably includes a top plate notched portion 3223a which is arranged at an inner circumferential edge of the top plate portion 3221a so as to achieve the proper weight balance of the rotor holder 322b in the axial and circumferential directions. The rotor holder 322b may also include, in the same manner as in the first preferred embodiment, the side wall portion through hole 3224 (see FIG. 2).

Since the rotor holder 322b of the present preferred embodiment includes the side wall portion through hole 3224 and the top plate notched portion 3223a, the weight thereof is reduced, and therefore, the weight balance thereof is adjusted in the circumferential and axial directions. The manufacturing method of the rotor holder 322b is substantially identical with that of the first embodiment (see FIG. 3) except that a substantially round hole is arranged at a substantially central portion of the discoid portion 91 prior to step S15 in which a second punched portion becomes the top plate notched portion 3223a. Note that the hole at the central portion of the discoid portion 91 and the second punched portion mentioned above may be formed at the same time.

As described above, the manufacturing method of the rotor holder 322b of the third preferred embodiment, the side wall portion through hole 3224 and the top plate notched portion 3223a are respectively arranged at the side wall portion 3222 and the top plate portion 3221a by the progressive die by the progressive die so as to achieve the weight balance of the rotor holder 322b in the axial direction and the circumferential directions in an effective manner.

By virtue of such configuration, according to the motor 3 of the present preferred embodiment, it becomes possible to minimize the vibrations of the rotor portion 32 occurring due to weight unbalance of the rotor holder 322b.

While the present preferred embodiments have been described above, it is to be understood that variations and modifications will be apparent to those skilled in the art without departing the scope and spirit of the invention.

For example, although the locations of the first punched portion 914 and the second punched portion at the metal plate 90 are described above, the present invention is not limited thereto. The locations of the first punched portion 914 and the second punched portion may be varied depending on the size, shape, and material of the rotor holder.

Also, the side wall portion 3222 may be formed at the same time the top plate portion 3221 is formed. Also, the second punched portion may be formed at the same as the first punched portion is formed.

Although the preferred embodiments described above assume that the holes arranged at the rotor holder include either round or the oval shape, the present invention is not limited thereto.

Although the preferred embodiments described above assume that the progressive die and/or the transfer die are used, the present invention is not limited thereto.

Although the preferred embodiments above assume that the motor 3 is used as a drive source for a fan apparatus or the like, the present invention is not limited thereto.

Although the preferred embodiments above assume that the motor 3 is the outer rotor type motor, the present invention is not limited thereto.

Also, although the preferred embodiments assume that the bearing mechanism includes the radial bearing, the present invention is not limited thereto. The present invention may include a fluid dynamic pressure bearing.

What is claimed is:

1. A method of manufacturing a rotor holder of a motor, the method comprising:
   (a) performing a test to predetermine an imbalance of a rotor holder having a top plate portion and a side wall portion;
   (b) subsequently forming a top plate portion having a substantially discoid shape substantially centered about a central axis, and a side wall portion extending in a direction substantially parallel to the central axis from the outer periphery of the top plate portion by feeding a metal plate in a predetermined direction and shaping the metal plate with a die; and (c) using the die, punching a hole through the metal plate, of dimensions and at a location based on an outcome of the test, before said shaping of the metal plate is completed such that when the side wall portion is formed, the hole constitutes a punched part of the side wall portion.

2. The manufacturing method according to claim 1, wherein (c) is performed before (b) such that the hole is punched through the metal plate before the shaping of the metal plate begins.

3. The manufacturing method according to claim 2, wherein (c) comprises forming the hole to be substantially longer in a radial direction than in the circumferential direction with respect to the central axis.

4. The manufacturing method according to claim 2, further comprising (d) punching a hole through the metal plate at a location corresponding to the top plate portion.

5. The manufacturing method according to claim 4, wherein the die is one of a progressive die and a transfer die.

6. The manufacturing method according to claim 1, wherein the using of the die in (c) comprises selecting a pin of a given diameter from among a plurality of pins of different diameters, and positioning the selected pin in the die based on the outcome of the test, and then punching the hole through the metal plate with the pin.

7. The manufacturing method according to claim 1, wherein said performing of the test in (a) comprises fabricating a test rotor holder having a top plate portion and a side wall portion of shapes and dimensions corresponding to those formed in (b), and analyzing the degree to which the test rotor is unbalanced during rotation of the test rotor holder about an axis extending through the center of the top plate portion of the test rotor holder.

8. The manufacturing method according to claim 7, wherein the using of the die in (c) comprises selecting a pin of a given diameter from among a plurality of pins of different diameters, and positioning the selected pin in the die based on the outcome of the test, and then punching the hole through the metal plate with the pin.

* * * * *